United States Patent
Tabata

(10) Patent No.: US 6,740,006 B2
(45) Date of Patent: May 25, 2004

(54) CONTROL DEVICE FOR AN AUTOMATIC TRANSMISSION

(75) Inventor: Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/244,373

(22) Filed: Sep. 17, 2002

(65) Prior Publication Data

US 2003/0013571 A1 Jan. 16, 2003

Related U.S. Application Data

(62) Division of application No. 09/636,462, filed on Aug. 11, 2000, now Pat. No. 6,503,170.

(30) Foreign Application Priority Data

Aug. 20, 1999 (JP) .......................................... 11-233681

(51) Int. Cl.[7] .............................................. F16H 61/16
(52) U.S. Cl. ........................ 477/118; 477/125; 477/901
(58) Field of Search ........................... 475/254; 477/97, 477/901, 903, 125, 118; 701/52, 65

(56) References Cited

U.S. PATENT DOCUMENTS

| | | | | | |
|---|---|---|---|---|---|
| 3,996,817 A | * | 12/1976 | Winzeler | ..................... | 475/69 |
| 4,823,646 A | * | 4/1989 | Yoshimura et al. | ......... | 477/148 |
| 5,121,657 A | * | 6/1992 | Asada | ........................ | 477/120 |
| 5,231,582 A | * | 7/1993 | Takahashi et al. | ............ | 701/56 |
| 5,390,116 A | * | 2/1995 | Hayafune | .................... | 701/65 |
| 5,393,275 A | * | 2/1995 | Okada et al. | .................. | 477/81 |
| 5,679,092 A | * | 10/1997 | Otsubo et al. | ................. | 477/97 |
| 5,813,942 A | * | 9/1998 | Nakagawa et al. | ......... | 477/120 |
| 6,002,977 A | * | 12/1999 | Hirano et al. | .................. | 701/65 |
| 6,070,118 A | * | 5/2000 | Ohta et al. | ..................... | 701/65 |
| 6,085,139 A | * | 7/2000 | Nakauchi et al. | ............. | 701/52 |
| 6,106,434 A | * | 8/2000 | Ibamoto et al. | ............. | 477/120 |
| 6,278,928 B1 | * | 8/2001 | Aruga et al. | ................... | 701/65 |

FOREIGN PATENT DOCUMENTS

| | | | |
|---|---|---|---|
| EP | 503948 | * | 9/1992 |
| JP | 8-177984 | | 7/1996 |

* cited by examiner

*Primary Examiner*—Ha Ho
(74) *Attorney, Agent, or Firm*—Oblon, Spivak, McClelland, Maier & Neustadt, P.C.

(57) ABSTRACT

A control device for an automatic transmission which prevents an automatic transmission from executing a "busy-shift" caused by a lower gear ratio of the highest gear, and which reduces revolutions of a driving power source at high speed. The control device includes an automatic shift mode, an independent manual shift mode, and a highest gear control. The automatic shift mode automatically determines a gear ratio of the automatic transmission on the basis of a driving condition of a vehicle having the automatic transmission. The manual shift mode determines a gear ratio of the automatic transmission by a driver's intention. The highest gear control controls the automatic transmission, so that the smallest gear ratio set by the manual shift mode is smaller than the smallest gear ratio set by the automatic shift mode. If the gear ratio of the highest gear of the automatic shift mode is not so small, a shift caused by a change of a driving condition does not easily occur. The busy-shift can be avoided in the automatic transmission.

1 Claim, 18 Drawing Sheets

|      | K0 | K1 | K2 | K3 | B0 | B1 | B2 | B3 | B4 | F0 | F1 | F2 |
|------|----|----|----|----|----|----|----|----|----|----|----|----|
| P    | ○  |    |    |    |    |    |    |    |    | ○  |    |    |
| R    |    |    | ○  |    | ○  |    |    |    | ○  |    |    |    |
| N    | ○  |    |    |    |    |    |    |    |    | ○  |    |    |
| 1st  | ○  | ○  |    |    |    |    |    |    | ◉  | ○  |    | ○  |
| 2nd  | ◉  | ○  |    |    |    |    |    | ○  |    | ○  |    |    |
| 3rd  | ○  | ○  |    |    |    | ◉  | ○  |    |    | ○  | ○  |    |
| 4th  | ○  | ○  |    | ○  |    |    | △  |    |    | ○  |    |    |
| 5th  |    | ○  |    | ○  | ○  |    | △  |    |    |    |    |    |
| 6th  | ○  |    |    | ○  |    | ○  | △  |    |    | ○  |    |    |

○ ENGAGED
◉ ENGAGED IN ENGINE BRAKING
△ ENGAGED BUT NO POWER TRANSMITTING

FIG.8

| SHIFT LEVER POSITION | AUTOMATIC SHIFT MODE | SHIFT LEVER POSITION | MANUAL SHIFT MODE |
|---|---|---|---|
| D | 1st, 2nd, 3rd, 4th, 5th | M | 1st, 2nd, 3rd, 4th, 5th, 6th |
| 4 | 1st, 2nd, 3rd, 4th | | 1st, 2nd, 3rd, 4th, 5th |
| 3 | 1st, 2nd, 3rd | | 1st, 2nd, 3rd, 4th |
| 2 | 1st, 2nd | | 1st, 2nd, 3rd |
| L | 1st | | 1st, 2nd |
| | | | 1st |

FIG.9

| SHIFT LEVER POSITION | AUTOMATIC SHIFT MODE | SHIFT LEVER POSITION | MANUAL SHIFT MODE |
|---|---|---|---|
| D | 1st, 2nd, 3rd, 4th, 5th | M | 6th |
| 4 | 1st, 2nd, 3rd, 4th | | 5th |
| 3 | 1st, 2nd, 3rd | | 4th |
| 2 | 1st, 2nd | | 3rd |
| L | 1st | | 2nd |
| | | | 1st |

FIG.17

| SHIFT LEVER POSITION | NORMAL MODE |
|---|---|
| D | 1st, 2nd, 3rd, 4th, 5th, 6th |
| 5 | 1st, 2nd, 3rd, 4th, 5th |
| 4 | 1st, 2nd, 3rd, 4th |
| 3 | 1st, 2nd, 3rd |
| 2 | 1st, 2nd |
| L | 1st |

FIG.20

| SHIFT LEVER POSITION | FOLLOWING MODE | NORMAL MODE |
|---|---|---|
| D | 1st, 2nd, 3rd, 4th, 5th | 1st, 2nd, 3rd, 4th, 5th, 6th |
| 4 | 1st, 2nd, 3rd, 4th | 1st, 2nd, 3rd, 4th |
| 3 | 1st, 2nd, 3rd | 1st, 2nd, 3rd |
| 2 | 1st, 2nd | 1st, 2nd |
| L | 1st | 1st |

…

CONTROL DEVICE FOR AN AUTOMATIC TRANSMISSION

CROSS REFERENCE TO RELATED APPLICATION

This application is a divisional application of Ser. No. 09/636,462, filed on Aug. 11, 2000, now allowed U.S. Pat. No. 6,503,170.

FIELD OF THE INVENTION

The present invention relates to an automatic transmission in which a gear ratio can be set on the basis of a driving condition, for example a load against a power source of a vehicle, a vehicle speed, etc. Especially, this invention relates to a control device of the automatic transmission in which a gear ratio of overdrive gears can be set.

BACKGROUND OF THE INVENTION

A power source, for example an internal combustion engine or/and an electric motor, etc. are installed in a vehicle. Since characteristics of such a power source do not necessarily satisfy an output power required over the entire range of a vehicle from starting to high speed running, a transmission is mounted in the vehicle in addition to the power source in order to increase or reduce driving torque or a rotation speed of the power source. As one example of the transmission, an automatic transmission, which is automatically controlled to shift gears according to a running condition of the vehicle, is adopted in many cases. Furthermore, in accordance with a required improvement of power output characteristics or a required reduction of fuel consumption of the vehicle, the smallest gear ratio of the automatic transmission tends to be smaller than 1. A revolution of the power source can be reduced in high speed running of the vehicle, owing to the above-mentioned automatic transmission.

In the aforementioned background, an automatic transmission with a plurality of shift gears tends to multiply the number of the shift gears in these days. One example of such an automatic transmission is shown in Japanese Laid-Open Patent Application No. 8-177994. The automatic transmission shown in this Patent Application, has a structure mainly having 3 sets of planetary gears, and $5^{th}$ gear and $6^{th}$ gear are respectively overdrive gears. Furthermore, rotating speeds of rotating members of the automatic transmission are restrained.

In the automatic transmission with six forward gears, the gear ratio of the highest gear (i.e. the smallest gear ratio of the automatic transmission) is smaller than a gear ratio of the highest gear ratio of an automatic transmission with five forward gears. Since an engine revolution in a vehicle having the automatic transmission can be reduced, the fuel consumption of the vehicle is improved during high speed driving. Furthermore, since excessive high rotating speeds of rotating members can be avoided, a durability of the automatic transmission is improved.

Since the gear ratio of $6^{th}$ gear, as the highest gear, is small, however, the driving torque of the vehicle in $6^{th}$ gear is small. The $6^{th}$ gear is set when a load of an engine is low (i.e. a throttle angle or accelerator angle is low), and a speed of the vehicle is rather high. Consequently, even though the speed of the vehicle reduces only a few, or the engine load increases only a few by depressing an accelerator pedal of the vehicle, a driving condition of the vehicle enters into the $5^{th}$ gear range, and a down-shift of the automatic transmission from $6^{th}$ gear to $5^{th}$ gear occurs. If the speed of the vehicle is higher or the engine load is lower by pulling back the accelerator pedal after the down-shift happens, the driving condition of the vehicle again enters into the $6^{th}$ gear range, and the up-shift of the automatic transmission occurs.

As mentioned above, from the viewpoint of fuel efficiency of the vehicle it is advantageous that the automatic transmission has multiplied gears. On the contrary, however, an up-shift or a down-shift of the automatic transmission frequently occurs, caused by only a little fluctuation of a driving condition of the vehicle. Such a phenomenon is called "busy-shift". That is, a driver of the vehicle might feel uncomfortable because of the busy-shift.

SUMMARY OF THE INVENTION

It is thus one object of the present invention to solve the aforementioned problems. That is, the object of the invention is to provide a control device for an automatic transmission which prevents an automatic transmission from the above-mentioned busy-shift caused by a lower gear ratio of the highest gear, and which enables to effectively and practically use a gear ratio of the highest gear.

A control device for an automatic transmission comprises a selecting device and a highest gear control means. The selecting device selects an automatic shift mode or an independent manual shift mode. The automatic shift mode automatically determines a gear ratio of the automatic transmission on the basis of a driving condition of a vehicle having the automatic transmission. The manual shift mode determines a gear ratio of the automatic transmission by a driver's intention. The highest gear control means controls the automatic transmission so that the smallest gear ratio set by the manual shift mode is smaller than the smallest gear ratio set by the automatic shift mode.

If the gear ratio of the highest gear of the automatic shift mode is not so small, a shift caused by a change of a driving condition does not easily occur. That is, the busy-shift can be avoided in the automatic transmission. Although the further small gear ratio can not be adopted in the automatic shift mode, it can be set if the manual shift mode is selected. In this case, revolutions of a driving power source is reduced and fuel efficiency can be improved.

A control device for an automatic transmission comprises a shift device and a means for guiding the shift device. The shift device selects a neutral position, a highest gear prohibition position, a highest gear permission position, and a middle speed position. In the neutral position, the automatic transmission does not output a torque to an output shaft of the automatic transmission. In the highest gear prohibition position, the highest gear of the automatic transmission is prohibited. In the highest gear permission position, the highest gear of the automatic transmission is allowable. In the middle speed position, a gear ratio can be set between the largest gear ratio and a predetermined gear ratio larger than the smallest gear ratio of the highest gear prohibition position. The guiding means guides the shift device along a path to the neutral position, a path to the highest gear permission position, and a path to the middle speed position. Each path separately branches off from the highest gear prohibition position and is connected to the neutral position, the highest gear permission position, and the middle speed position.

Since the highest gear is not set in the highest gear prohibition position which is selected by moving a shift device from the neutral position, a slight change of a driving condition in high speed running does not cause a down-shift of the automatic transmission. Consequently, the busy-shift can be avoided. On the contrary, since the highest gear permission position is selected by further moving the shift device, and the highest gear in the highest gear permission position is intentionally set by a manual operation. In other wards, since the highest gear can intentionally be released, the busy-shift can be avoided by the manual operation. Furthermore, even if a gear shift happens at the highest gear running in the highest gear permission position, a driver does not feel uncomfortable, because the driver selects such a position and is ready for the down-shift.

A control device for an automatic transmission comprises a plurality of overdrive gears and a highest gear prohibition means. The highest gear prohibition means prohibits the smallest gear ratio of the overdrive gears of the automatic transmission when a speed of a vehicle having the automatic transmission is equal to or over a predetermined value and a running resistance of the vehicle is equal to or over a predetermined value.

Since the automatic transmission has a plurality of overdrive gears, revolutions of a driving power source can be reduced by selecting the smaller gear ratio among the overdrive gears in high speed driving. The fuel efficiency of the vehicle is then improved. On the other hands, when the vehicle runs on a slope at high speed and a running resistance is high, the smallest gear ratio is prohibited. Since the gear ratio is not so small in this case, a down-shift does not easily occur. Therefore the busy-shift can be avoided.

A control device for an automatic transmission is installed in a vehicle having a driving instruction system. The driving instruction system detects a predetermined scheduled course for driving the vehicle and a road condition of the predetermined scheduled course. The control device comprises a means for controlling a gear shift of the automatic transmission and a highest gear prohibition means. The means controls a gear shift on the basis of the road condition of the predetermined scheduled course. The highest gear prohibition means prohibits the smallest gear ratio of the overdrive gears of the automatic transmission, when the vehicle is driven on the predetermined scheduled course, a speed of the vehicle is equal to or over a predetermined value, and a running resistance of the vehicle is equal to or over a predetermined value.

When a road ahead for high speed running is detected in a predetermined scheduled course and a rather high torque is necessary for the vehicle to run on the road, the highest gear of the automatic transmission is prohibited before the vehicle gets to the road. Since the needed driving torque is secured when the vehicle runs on the road, it can be avoided in advance that the vehicle speed is slower and a shift-down occurs or an up-shift after the shift-down (that is the busy-shift) occurs.

A control device for an automatic transmission is installed in a vehicle which has a following device. The following device follows another vehicle ahead and comprises a shift device and a highest gear prohibition means. The highest gear prohibition means prohibits the smallest gear ratio of the overdrive gears of the automatic transmission when the vehicle is driven by the following device.

Since the highest gear is not set when the vehicle follows another vehicle, enough torque for driving is secured. Consequently, a following and response ability to the vehicle ahead can be improved.

BRIEF DESCRIPTION OF THE DRAWINGS

The above and other objects, features, advantages, and technical and industrial significance of this invention will be better understood by reading the following detailed description of a presently preferred embodiment of the invention, when considered in connection with the accompanying drawing, in which:

FIG. 8 is a diagram showing shift gears available in each shift position where a shift gear among a plurality of shift gears is available by a manual operation M position;

FIG. 9 is a diagram showing another type of shift gears where only one shift gear is respectively set by a manual operation in M position;

FIG. 17 is a diagram showing shift gears available in each shift position for the fourth embodiment;

FIG. 20 is a diagram showing another example of shift gears available in each shift position adopted to the fourth embodiment.

DETAILED DESCRIPTION OF PREFERRED EMBODIMENTS

Figure 2:
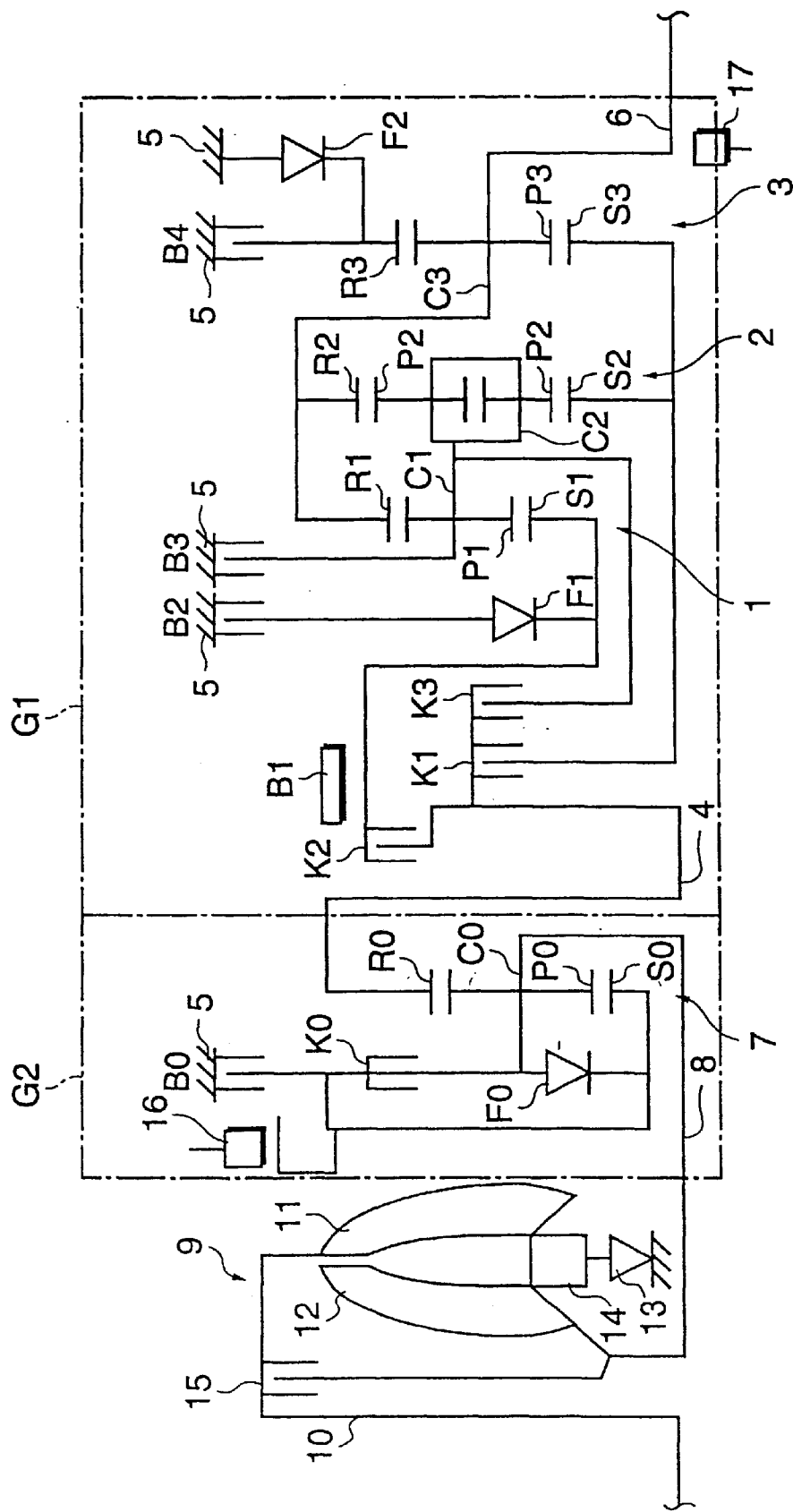
FIG. 2 is a schematic skeleton drawing of an automatic transmission to which the control device can be adopted.

In the following description and the accompanying drawings, the present invention will be described in more detail in terms of specific embodiments. An automatic transmission having a control device of the present invention is first explained. FIG. 2 is a schematic skeleton view which illustrates one example of the automatic transmission. This automatic transmission comprises a main-transmitting device G1 and a sub-transmitting device G2. The main-transmitting device G1 has two sets of single-pinion type planetary gears, one set of double-pinion type planetary gear, and a plurality of friction engaging means. The sub-transmitting device G2 has a single pinion type planetary gear and a plurality of friction engaging means. In the automatic transmission, six forward shift gears and one reverse shift gear can be set by this structure and by engaging or disengaging the friction engaging means.

First, the above-mentioned main-transmitting device G1 is described. A first planetary gear 1 is a single-pinion type planetary gear having a sun gear S1, a ring gear R1, and a carrier C1. The carrier C1 comprises a plurality of pinions P1. The sun gear S1 rotates at the center circle of the first planetary gear 1 and engages the pinions P1. The ring gear R1 rotates at the outer circle of the first planetary gear 1. The pinions P1 are disposed between the sun gear S1 and the ring gear R1. The pinions P1 rotate while moving along the outer circumference of the sun gear S1. The carrier C1 supports a rotational shaft of each pinion P1.

In the same way, a second planetary gear 2 is a double-pinion type planetary gear having a sun gear S2, a ring gear R2, and a carrier C2. The carrier C2 comprises a plurality of pinions P2. The pinions P2, here, are different from the aforementioned pinions P1. The pinions P2 comprise a double set of pinions. Each pinion of one set of pinions respectively engages each pinion of another set of pinions. The sun gear S2 rotates at the center circle of the second planetary gear 2 and engages the pinions P2. The ring gear R2 rotates at the outer circle of the second planetary gear 2. Two sets of pinions P2 are disposed between the sun gear S2 and the ring gear R2. The pinions P2 rotate while moving along the outer circumference of the sun gear S2. The carrier C2 supports a rotational shaft of each pinion P2.

Furthermore, a third planetary gear 3 is a single-pinion type planetary gear having a sun gear S3, a ring gear R3, and a carrier C3. The carrier C3 comprises a plurality of pinions P3. The sun gear S3 rotates at the center circle of the planetary gear 3 and engages the pinions P3. The ring gear R3 rotates at the outer circle of the third planetary gear 3. The pinions P3 are disposed between the sun gear S3 and the ring gear R3. The pinions P3 rotate while moving along the outer circumference of the sun gear S3. The carrier C3 supports a rotational shaft of each pinion P3.

Each rotating member of the planetary gears 1, 2, and 3 is connected together as follows. The planetary gears 1, 2, and 3 are co-axially disposed in order of 1, 2, and 3. The carrier C1 of the first planetary gear 1 is coupled to the carrier C2 of the second planetary gear 2, and they rotate as one body. The ring gear R1 of the first planetary gear 1 is coupled to the ring gear R2 of the second planetary gear 2, and the ring gear R2 is coupled to the carrier C3 of the third planetary gear 3. All three of these members, R1, R2, and C3, rotate as one body. Furthermore, the sun gear S2 of the second planetary gear 2 is coupled to the sun gear S3 of the third planetary gear 3, and they rotate as one body.

Next, the friction engaging means in the main-transmitting device G1 are explained. An intermediate shaft 4 as a hollow or solid shaft is deposited coaxial to the first planetary gear 1 in the front of the first planetary gear 1. The intermediate shaft 4 is selectively connected to the sun gears S2 and S3 by engagement of a first clutch K1. The intermediate shaft 4 is selectively connected to the sun gear S1 of the first planetary gear 1 by engagement of a second clutch K2.

Furthermore, the intermediate shaft 4 is selectively connected to the carrier C1 of the first planetary gear 1 and the carrier C2 of the second planetary gear 2 by engagement of a third clutch K3. These clutches K1, K2, K3 are required to have a capacity for transmitting torque selectively. A multi-plate clutch by engaging or disengaging oil pressure, a dry type single plate clutch, or a one-way clutch is adequately adopted to each above-mentioned clutch.

A first brake B1 is provided for selectively stopping the rotation of the sun gear S1 of the first planetary gear 1. A one-way clutch F1 is deposited between the sun gear S1 and a second brake B2 having a plurality of plates, and the one-way clutch F1 prevents the sun gear S1 from rotating in a predetermined direction. The second brake B2 is fixed by a fixing part 5 (for instance, a casing of the automatic transmission). A third brake B3 is deposited between the carrier C1 of the first planetary gear 1 and the fixing part 5. The third brake B3 having a plurality of plates selectively stops a rotation of the carriers C1 and C2 which are coupled together.

Furthermore, a fourth brake B4 is deposited between the ring gear R3 of the third planetary gear 3 and the fixing part 5. The fourth brake B4 also having multiple plates selectively stops a rotation of the ring gear R3. A one-way clutch F2 is provided in parallel with the fourth brake B4, and the one-way clutch F2 prevents the ring gear R3 from rotating in a predetermined direction. An output shaft 6 is coupled to the carrier C3 of the third planetary gear 3 in order to rotate as one body.

Next, the sub-transmitting device G2 comprises one set of a single pinion type planetary gear 7, and two conditions of high and low gears can be set by the sub-transmitting device G2. That is, a carrier C0 is an input member, and an input shaft 8 is connected to the carrier C0. A multi-plate clutch K0 and a one-way clutch F0 are deposited in parallel together, between a sun gear S0 and a carrier C0. The carrier C0 supports pinions P0 which engages the sun gear S0 and rotates while moving along the outer circumference of the sun gear S0. The one-way clutch F0 engages, when the sun gear S0 is about to relatively rotate against the carrier C0 in the normal direction. Furthermore, a brake B0 having a plurality of plates is deposited between the sun gear S0 and the fixing part 5. The brake B0 selectively stops the sun gear S0 from rotating. A ring gear R0 is coupled to the intermediate shaft 4 included in the main-transmitting device G1.

Furthermore, a torque converter 9 with a lock-up clutch 15 is provided in the input side of the sub-transmitting device G2. This torque converter 9 is a conventional type and forms a sealed-up container with a front cover 10 and a shell of a pump impeller 11. The pump impeller 11 contains oil (automatic transmission oil, also called AT fluid). In the container a turbine runner 12 is deposited facing the pump impeller 11, and the turbine runner 12 is connected to the above-mentioned input shaft 8 as one body.

Furthermore, a stator 14 which is held by a one-way clutch 13 is deposited in the rotating center circle of the torque converter 9 between the pump impeller 11 and the turbine runner 12. The lock-up clutch 15 is deposited facing the inner face of the front cover 10, and the lock-up clutch 15 can be engaged by contacting the front cover 10 or disengaged by being apart from the front cover 10. The lock-up clutch 15 directly connects the pump impeller 11 to the turbine runner 12. That is, when the lock-up clutch 15 engages, the pump impeller 11 and the turbine runner 12 rotate as one body.

Incidentally, a turbine rotation speed NT sensor 16 is provided for detecting a turbine speed as an input rotation speed of the automatic transmission, and an output rotation speed sensor 17 is provided for detecting an output speed of the automatic transmission as a vehicle speed.

Figures 3, 4:
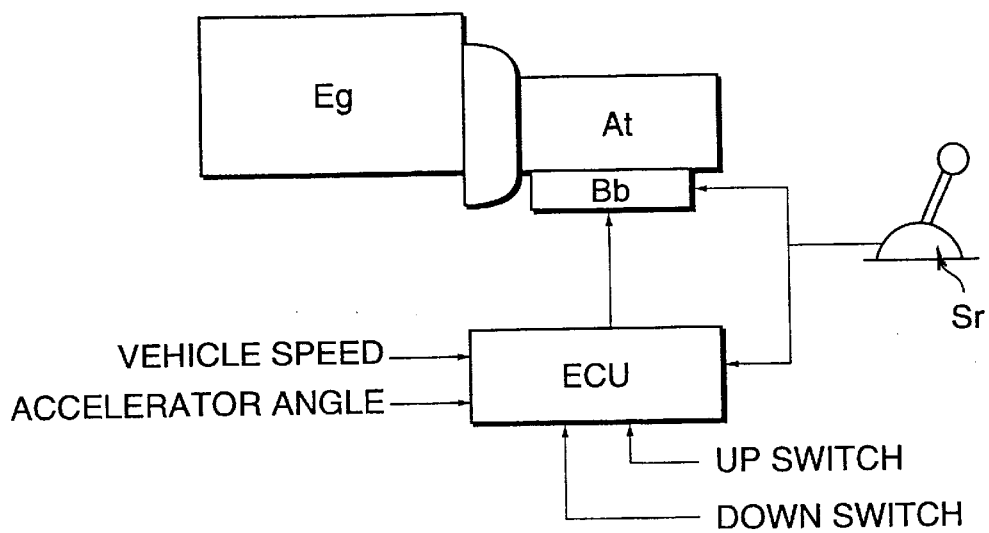
FIG. 3 is a schematic view of a power train including the automatic transmission.
FIG. 4 is a diagram which shows an engagement and a disengagement of each clutch, brake, or one-way clutch for setting each shift gear and shift position of the automatic transmission.

The above-mentioned automatic transmission is shown as At in FIG. 3. The automatic transmission At is combined to an engine Eg (an internal combustion engine or a diesel engine) at an output side of the engine Eg and they are installed in a vehicle (shown in FIG. 21). Incidentally, the automatic transmission At can be combined to the other type of a power source, for example an electric motor in an electric power source vehicle, a hybrid type power source having an engine and an electric motor in a hybrid vehicle, etc. On the basis of a load of the engine Eg determined by an acceleration angle or a throttle angle, or a driving condition determined by a turbine rotation speed or a vehicle speed, a shift gear of the automatic transmission At is electrically controlled according to a shift lever position. That is, an oil pressure control device Bb is provided for electrically controlling supply or release of the oil pressure. Shifting a gear of the automatic transmission At is set by an ECU (Electric Control Unit) which receives each signal from each sensor shown in FIG. 12 and controls the oil pressure control device Bb.

The ECU mainly comprises a micro-computer, the same as a conventional electric control unit. The ECU determines a gear shift of the automatic transmission At, on the basis of an input signal indicating a driving condition, for example a vehicle speed V, an acceleration angle Acc, etc. and a shifting map which is memorized in advance. The ECU also controls an engagement, a disengagement, or a half engagement of the lock-up clutch 15. Half engagement, here, means a condition where clutch plates of a lock-up clutch slips and the lock-up clutch engages insufficiently.

A shift device Sr is provided for selecting a neutral position, a driving position, a reverse position, etc. A shift position of the shift device Sr determines a supply or release of oil pressure in the oil pressure control device Bb. The shift device Sr is not only mechanically connected to a predetermined valve in the oil pressure control device Bb, but a switch or a sensor attached to the shift device Sr is also connected to the ECU. An output signal of the switch or the sensor is inputted to the ECU.

When a forward driving position is selected in the shift device Sr, each shift gear of the automatic transmission At is determined by supply or release of the oil pressure to the aforementioned friction engaging means by way of the oil pressure control device Bb, based on the output signal of the ECU. D (Drive) position, P (Park) position in which the vehicle stops, R (Reverse) position in which the vehicle runs in the reverse direction, N (Neutral) position, etc. are selected by the shift device Sr. The supply or release of each friction engaging means controlled by the ECU is shown in FIG. 4.

In FIG. 4, P, R, or N indicates a park, reverse, or neutral position selected by the shift device Sr. Each gear from $1^{st}$ through $6^{th}$ is determined when the forward driving position is set. ○ shows an engaged condition of each friction engaging means, ◎ shows an engaged condition in an engine braking, and Δ shows an engaged condition where no power is transmitted. Each vacant space shows a disengaged condition.

As shown in FIG. 4, six forward shift gears can be set in the automatic transmission At. Each gear from $1^{st}$ until $4^{th}$ gear, and $6^{th}$ gear is set by engaging the clutch K0 of the sub-transmitting device G2 (This condition is the low gear of the sub-transmitting device G2 and also a direct connection between the input shaft 8 and the intermediate shaft 4.) and by engaging or disengaging each friction engaging means of the main-transmitting device G1. $5^{th}$ gear is set by the direct connection of the G1 where the whole members of the main-transmitting device G1 rotates as one body, and by the condition where G2 is set as the high gear. Each gear ratio of $5^{th}$ gear and $6^{th}$ gear is less than 1, and such a condition of $5^{th}$ or $6^{th}$ gear is called an overdrive gear.

Figure 5:
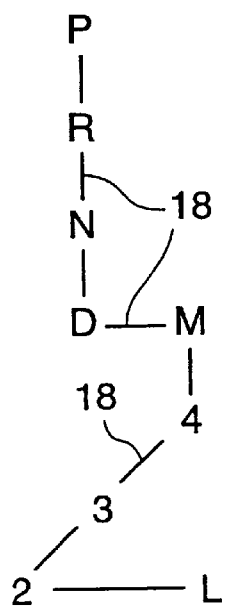
FIG. 5 is a schematic drawing showing one example of each shift position of a shift device for the automatic transmission of the first embodiment.

An automatic mode or a manual mode can be selected in the above-mentioned automatic transmission At. In the automatic mode, a shift gear is determined on the basis of an engine load and a driving condition of a vehicle speed or a turbine rotation speed. In a manual mode, a shift gear is determined according to an operation of a driver. In one example of the manual mode, a shift range is selected by an operation of a switch. The one example is shown in FIG. 5. Each shift position of the shift device Sr is shown in FIG. 5. Here, the upper side in FIG. 5 is the front of a vehicle or the upper side of the vehicle. P (Park), R (Reverse), N (Neutral), and D (Drive) positions are disposed in a row in order as shown in FIG. 5. M position is located adjacent to D position in the width direction of the vehicle. "4" position is deposited in the rear direction of the vehicle or downwards toward M position. "3" and "2" positions are located in order in the diagonally rear or diagonally downwards toward "4" position. L position is provided adjacent to "2" position in the transverse direction of the vehicle. Each position is selected by moving a shift lever of the shift device Sr. A guiding path 18 such as a groove for guiding the shift lever Lv, connects each above-mentioned position together.

Figure 6:
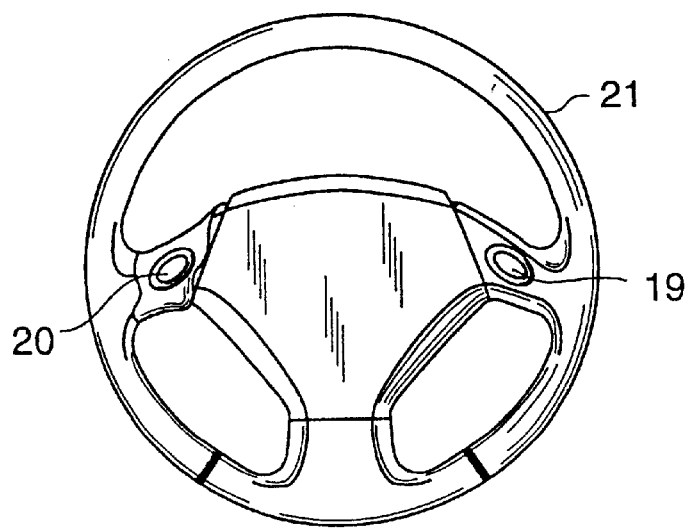
FIG. 6 is a schematic drawing which illustrates one example of a down-switch and an up-switch positions on a steering wheel.

M position is provided for changing a shift range by operating a switch manually. A down-switch 19 and an up-switch 20 are provided, and these switches can be operational when M position is selected. Positions of these switches are determined appropriately. One example of the positions is shown in FIG. 6, in which they are on spokes of a steering wheel 21. It is available and convenient that the down-switch 19 is on the front side facing a driver, and the up-switch 20 is on the reverse side.

Figure 7:
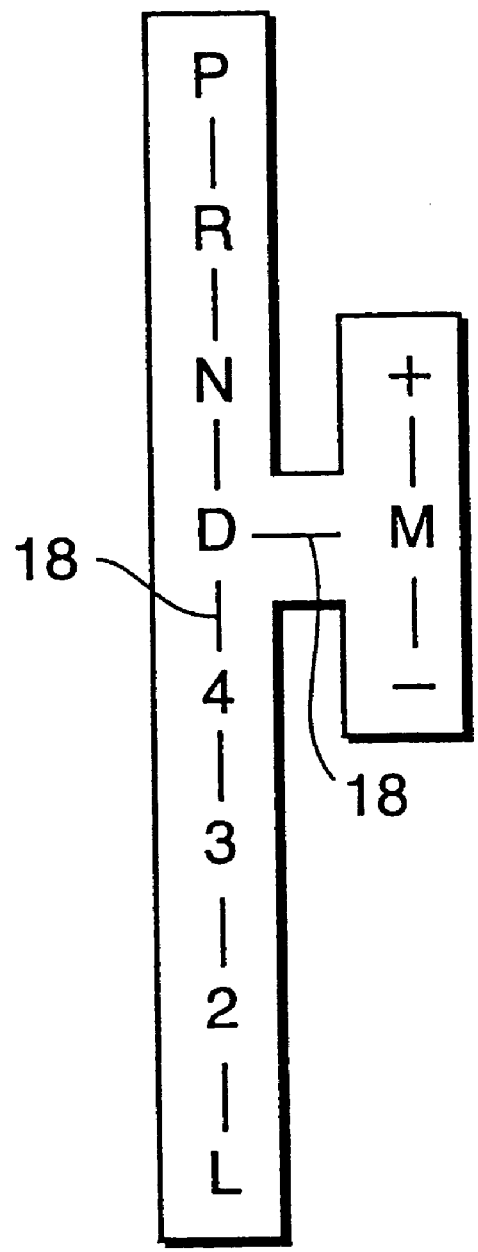
FIG. 7 is a schematic drawing which shows each shift position of another shift device having an up-position and a down-position.

It is also available that both of a shift position and a shift range are operated by moving the shift lever of the shift device Sr, as shown in FIG. 7. In this example, each position from P position to L position except M position is located in order in a line in the front-rear direction or the up-down direction, and each position is selected by moving a shift lever of the shift device Sr. The guiding path 18 such as a groove for guiding the shift lever, connects each aforementioned position. M position is deposited adjacent to D position in the transverse direction of the vehicle, and "+" (up) position and "−" (down) position are provided in both sides of M position in the front-rear direction or in up-down direction. Although each switch is not shown in FIG. 7, each switch on the up-down positions are respectively deposited. An up (+) signal or a down (−) signal is outputted in accordance with a switch-on of each switch by moving the shift lever.

Each above-mentioned shift position is for selecting a shift range where shift gears can be set, and the shift range of each position is shown in FIG. 8. First, one gear from $1^{st}$ gear to $5^{th}$ gear is available in D position. One gear from $1^{st}$ to $4^{th}$ gear can be available in "4" position. One gear from $1^{st}$ gear to $3^{rd}$ gear is available in "3" position. In L position, only $1^{st}$ gear is set.

A shift gear which can be set in each position is determined by the ECU on the basis of a driving condition such as an engine load or a vehicle speed, and a gear shift to a suitable gear is executed. In the above-mentioned way, when the shift lever is fixed to each position, a suitable gear is selected automatically according to the driving condition of the vehicle.

On the contrary, when M position is selected by moving the shift lever from D position, each position is set by pushing the up-switch 20 or the down-switch 19 or by moving the shift lever to "+" position or "−" position. That is, a manual operation is necessary in M position, and it is, then, called a manual mode. As shown in FIG. 8, six forward shift gears including $6^{th}$ gear (also called the second overdrive gear) can be set in M position. In other wards, when M position is manually shifted and up-switch 20 or "+" position is manually operated in the condition that the vehicle runs in $5^{th}$ gear and the vehicle speed increases, the up-shift from $5^{th}$ gear to $6^{th}$ gear can be executed.

When the down-shift switch 19 is manually operated or "−" position is selected in the case that M position is selected by the shift device Sr, a shift range is changed to the lower shift range. That is, the shift range is shifted to "4" range position, "3" range position, "2" range position, and L range position in order. When the up-shift switch 20 is manually pushed or the shift lever is moved to "+" position from L range position, a position is changed to the higher shift range in the reverse order. Each shift range in which a shift gear can be available in this manual shift mode is the same as in the automatic shift mode in this case. That is, each shift range having automatically selected gear ratios is selected by a driver's intention in the manual shift mode. Namely, the driver's intention can be reflected in the manual shift mode. Each shift range is controlled by moving a shift valve in the oil pressure control device. It is also available that each shift range is electrically controlled by the ECU.

As mentioned above, in the case of the manual mode, a shift gear of the lowest gear ratio can be manually selected, while the shift lever is fixed to M position. Generally, when a vehicle runs at a constant speed, since the shift position set at the running condition determines the highest gear among available shift gears of an automatic transmission, the highest gear among available shift gears is changed by manually switching operation, and the gear shift occurs. That is, a changing of a shift range of the automatic transmission in M position is in substance a manual shift. In the manual shift mode, the shift device Sr is fixed. A manual valve is then fixed. The shift range is selected by an electric control signal from the ECU.

Figure 10:
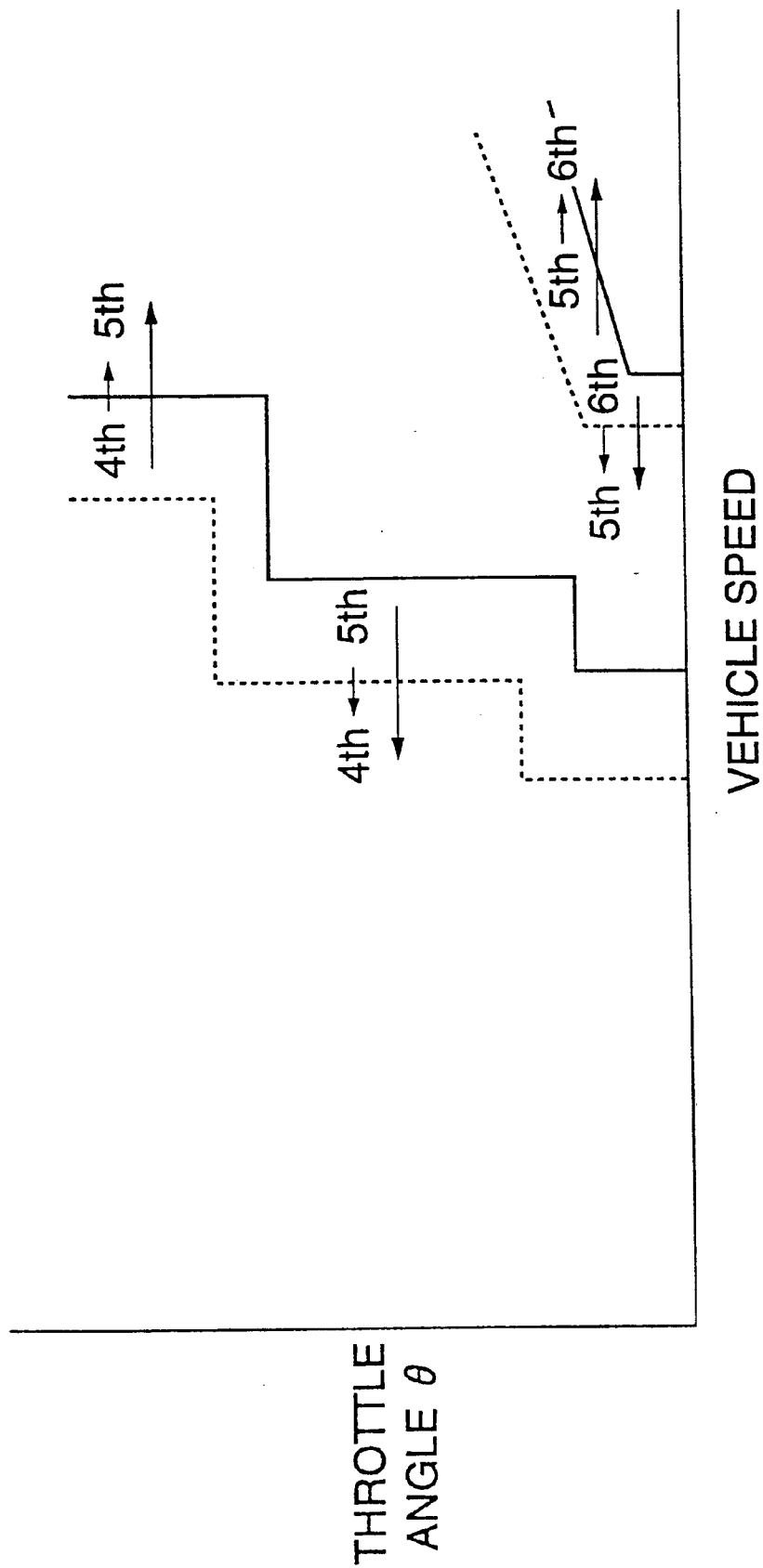
FIG. 10 is a diagram which shows a part of a shift pattern map setting a shift gear range of $6^{th}$ (Overdrive $2^{nd}$) gear.

$6^{th}$ gear, that is the second gear of the overdrive gears, can not be set in the automatic shift mode in which the shift device Sr is selected to D position. This means that $6^{th}$ gear is prohibited. On the contrary, $6^{th}$ gear can be set in the manual shift mode in which the shift device Sr is selected to M position, and the up-switch is operated. That is, $6^{th}$ gear is permitted. FIG. 10 shows a part of a shift pattern map which sets a shift gear range of $6^{th}$ gear. The shift gear range of the shift pattern map is determined by a vehicle speed (the horizontal line in FIG. 10) and a throttle angle θ (the vertical line in FIG. 10). The solid line shows an up-shift, and the dotted line shows a down-shift. A shift gear is changed when the running condition of the vehicle crosses each line of the above-mentioned lines. The $6^{th}$ shift gear range is set in the higher speed side and in the lower throttle angle side than the shift $5^{th}$ gear range. Consequently, $6^{th}$ gear is set in the range in which the engine load is low and the vehicle speed is high (ex. 120~130 km/h or more). On the contrary, when the position or the shift gear range in which $5^{th}$ gear is the highest is selected, a shift pattern map which does not include a $6^{th}$ gear range is adopted, and a gear shift is executed according to this shift pattern map. That is, $6^{th}$ gear is not set in this case.

Figure 11:
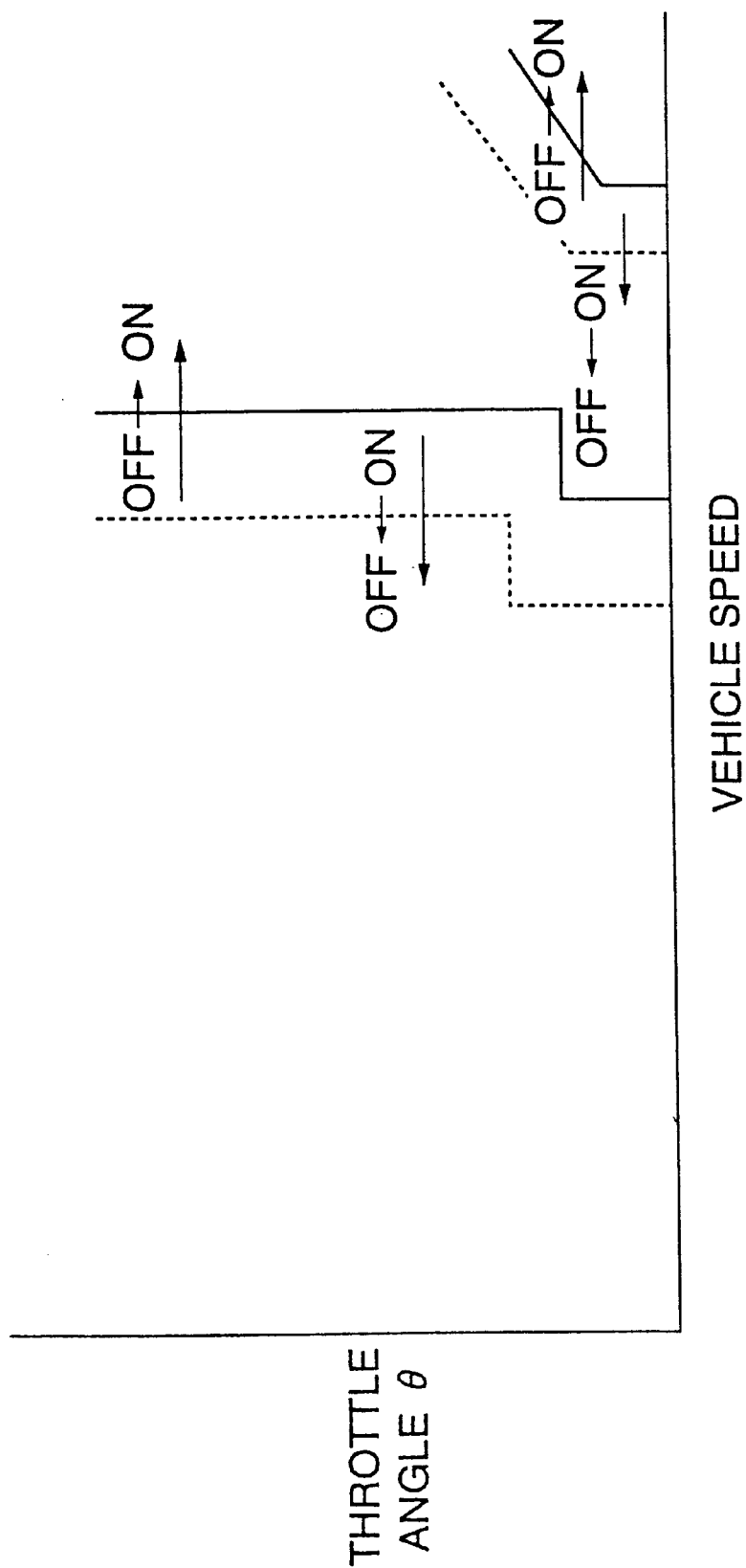
FIG. 11 is a diagram which shows a part of a lock-up pattern map setting a lock-up range in $6^{th}$ gear.

In FIG. 11 a part of a lock-up pattern map for controlling an engagement or a disengagement of the lock-up clutch 15 is shown. In this case, the lock-up clutch 15 is controlled based on the lock-up pattern map when $6^{th}$ gear is set. The engagement range of the lock-up clutch 15 is set in a high vehicle speed and a low throttle angle. Incidentally, the solid line an engagement of the lock-up clutch 15, and the dotted line indicates a disengagement of the lock-up clutch 15. When the driving condition in $6^{th}$ gear crosses each line of these lines, the lock-up clutch 15 is engaged or disengaged.

The above-mentioned embodiment is one example in which a shift gear range is changed by a switch operation in M position. It is also available that a shift gear is selected by a manual operation, as shown in FIG. 9. That is, at each position from D to L position a shift gear is controlled in the automatic shift mode according to the driving condition. In M position, one gear is manually up-shifted, and one shift gear among six shift gears is set by an operation of the up-switch 20. In the same way, in M position one gear is manually down-shifted, and one shift gear among six shift gears is set by an operation of the down-switch 19. It is also available that these operations are executed by selecting the shift device Sr to the up position or the down position, as shown in FIG. 7. On the basis of the signals of these switches, the ECU outputs a shift signal which orders one gear up-shift or one gear down-shift from the current shift gear. That is, the gear ratio is directly selected by a driver's intention in the manual shift mode. In the manual shift mode, the shift device Sr is fixed. A manual valve is then fixed. The gear shift is electrically selected by the electric control signal from the ECU.

In this case as shown in FIG. 9, $5^{th}$ gear is the highest in the automatic shift mode, and $6^{th}$ gear is the highest in the manual shift mode when M position is selected. This means that $6^{th}$ gear can be set only by a manual operation of a driver.

Figure 12:
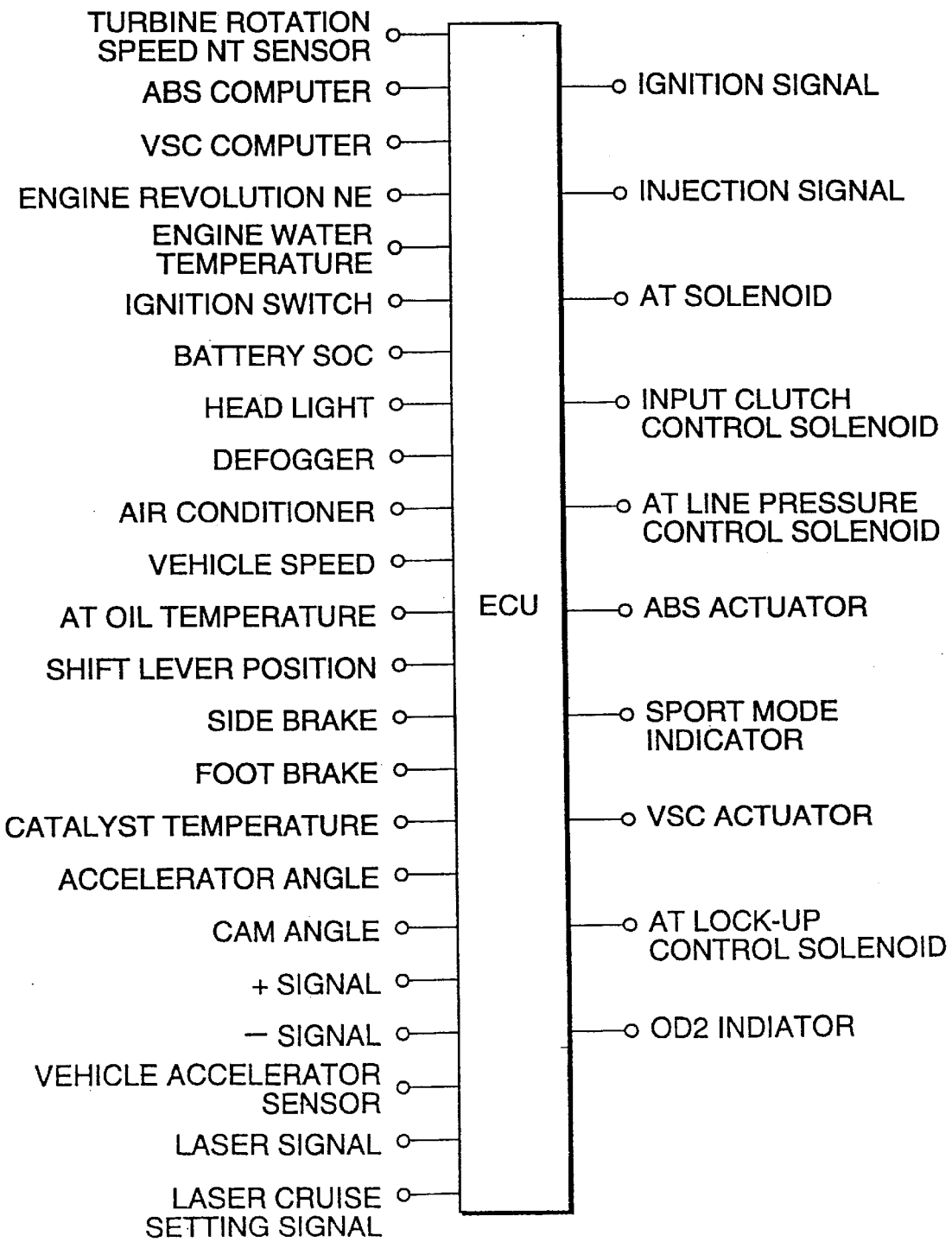
FIG. 12 is a block diagram showing input and output signals to an ECU (Electric Control Unit) of the control device.

The following signals are inputted or outputted to the electric control unit ECU in order to control the gear shift at each shift position: the shift gear range by the switch operation in M position, the engagement or disengagement of the lock-up clutch 15, and oil pressure to each friction member or each clutch. That is, a signal from a turbine rotation speed NT sensor 16, a signal from an ABS (Antilock Brake System) computer, a signal from VSC (Vehicle Stability Control) computer, a signal of an engine revolution NE, a signal of an engine water temperature, a signal from an ignition switch, a signal of a battery SOC (State Of Charge), an on-off signal from a head light, a signal from a defogger, an on-off signal from an air conditioner, a signal of a vehicle speed, a signal of an automatic transmission oil temperature, a signal of a shift lever position, an on-off signal from a side brake, an on-off signal from a foot brake, a signal of a catalyst temperature, a signal of an accelerator angle, a signal from a cam sensor, a + signal from the up-switch 20, a − signal from the down-switch 19, a signal from a vehicle accelerator sensor, a laser signal, a laser cruise setting signal, etc. are inputted to the ECU, as shown in FIG. 12. Incidentally, the battery SOC detects a condition of a battery which supplies an electric power to the above-mentioned motor installed in the hybrid vehicle or in the electric vehicle, or stores regenerated electricity in the case where a vehicle is a hybrid or an electric vehicle. The detected results are sent to the ECU for controlling on the basis of the detected results. The laser signal and the laser cruise setting signal are sent to the ECU for detecting a vehicle running ahead by using a laser radar and for automatically following the vehicle ahead while keeping a predetermined distance between the vehicle having this automatic transmission and the vehicle ahead.

The output signals are an ignition signal, an injection signal, a signal to an AT (Automatic Transmission) solenoid, a signal to an input clutch control solenoid, a signal to an AT line pressure control solenoid, a signal to an ASB actuator, a signal to a sport mode indicator, a signal to a VSC actuator, a signal to AT lock-up control solenoid, a signal to the second overdrive gear ($6^{th}$ gear) indicator, etc. Incidentally, the above-mentioned input clutch selectively connects or disconnects the engine to the drive line (the automatic transmission, etc.) in a vehicle having an economic running device or the hybrid vehicle. The economic running device automatically suspends the engine to rotate and restarts the engine, when the vehicle temporarily stops, and saves consumed fuel in this way.

As mentioned above, the gear ratio of the $6^{th}$ gear is two gears higher than a direct connected condition ($4^{th}$ gear) which gear ratio is 1. That is, $6^{th}$ gear is two gears higher overdrive gear. Thus, the gear ratio of $6^{th}$ gear is considerably small, and the output torque from the automatic transmission is low. Consequently, $6^{th}$ gear is only set in high speed and a low throttle angle. Since the engine revolution can be restrained low at high speed, the fuel efficiency at high speed can be improved. On the contrary, the engine load increases a little bit (this fact is shown as an increase of the throttle angle), and the down-shift tends to happen easily when the vehicle speed becomes slightly lower. Furthermore, subsequently the up-shift tends to happen. That is, the "busy-shift" easily happens.

Figure 1:
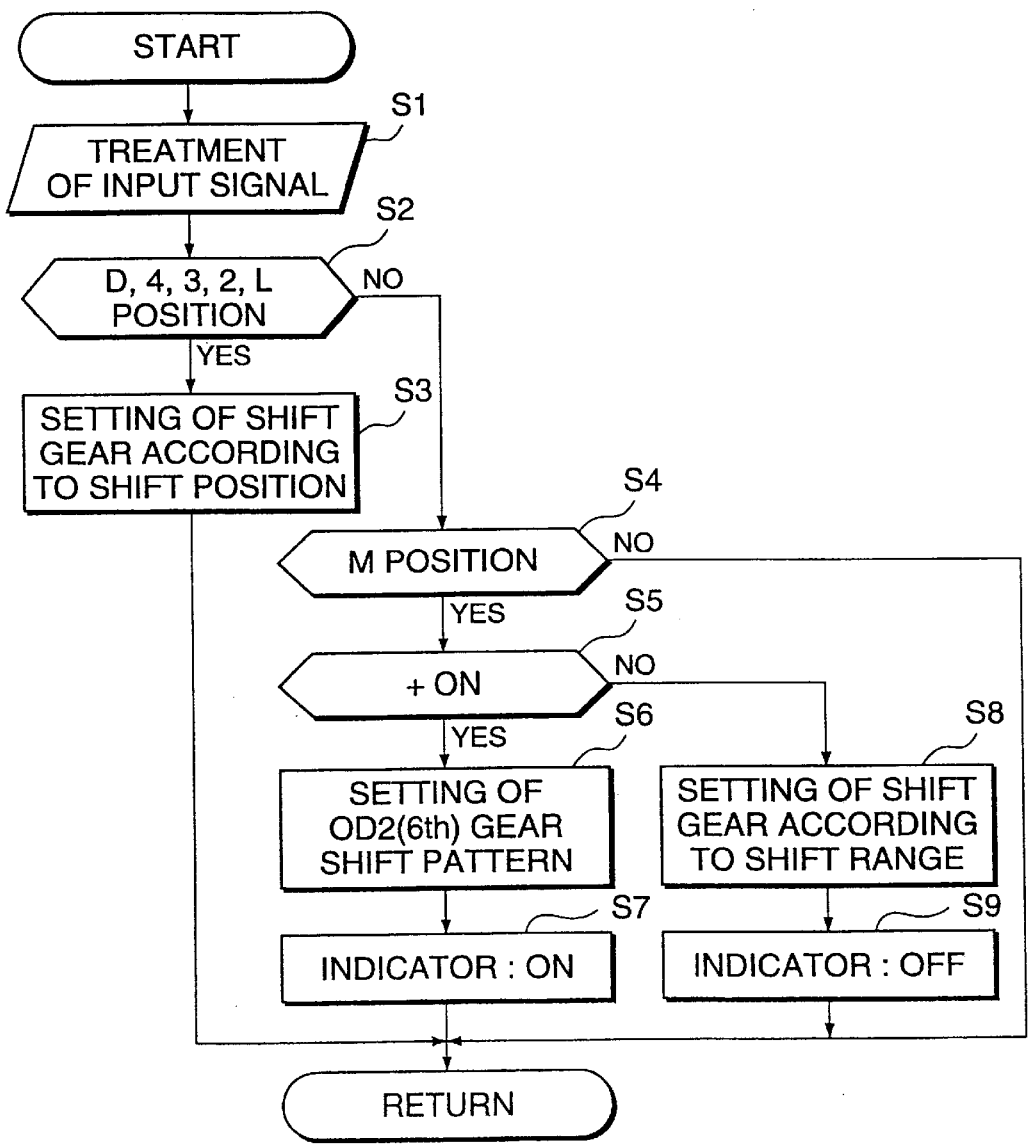
FIG. 1 is a flowchart which explains one example of a control device for an automatic transmission as a first embodiment of the present invention.

In a control device as a first embodiment of this present invention, $6^{th}$ gear as the second overdrive gear is controlled as follows. FIG. 1 is a flowchart which explains the control device of the first embodiment. First, input signals are treated (Step S1), and it is determined which is a position selected by the shift device Sr, whether D, "4", "3", "2", or L position (Step S2). This determination is executed based on a signal from, for example, a switch attached on the shift device Sr. These shift positions are set in the automatic shift mode. When one of these positions are selected by the shift device Sr, that is "yes" is determined in Step S2, the shift gear range is set according to the shift position (Step S3). The shift gear control is executed on the basis of the shift pattern map having a shift gear range in the automatic shift mode shown in FIG. 8.

When "no" is determined in Step S2, whether M position is selected by the shift device Sr or not is determined (Step S4). If "no" is determined in Step 4, any control is not done and the step goes to "return". This means that the vehicle is not in the forward driving condition. If "yes" is determined in Step S4, whether + switch is on or not is determined (Step S5). This operation is done by turning on the up-switch 20 while holding the M position in the example shown in FIGS. 5 and 6. Incidentally, the shift lever of the shift device Sr is moved to + position in another example shown in FIG. 7.

When the up-shift is executed, that is "yes" is determined in Step S5, the gear shift range in which $6^{th}$ gear (the second overdrive gear) is available is set in the manual shift mode (Step S6). That is, the shift pattern map, (one part of which is shown in FIG. 10) is taken up, and the gear shift is controlled based on this map. Furthermore, the lock-up pattern map shown in FIG. 11 is taken up, and the lock-up clutch 15 is controlled according to this map.

Since $6^{th}$ gear or the condition where $6^{th}$ gear is available is set by manually switching in the above-mentioned control, that is the gear shift range is manually set, the gear shift after this operation is automatically done on the basis of the driving condition and the shift pattern map. Once a gear shift until $6^{th}$ gear is available in Step S6, an indicator which shows "ON" of the second overdrive gear ($6^{th}$ gear) is turned on (Step S7).

Since the gear ratio of the second overdrive gear ($6^{th}$ gear) which is set in the above-mentioned way is small, the driving torque is not enough when the vehicle runs in $6^{th}$ gear. Consequently, the down-shift easily happens by slightly pushing an acceleration pedal or other things. This causes the "busy shift" or an uncomfortable feeling. However, this can be avoided by operating the down-switch 19 or shifting the shift lever of the shift device Sr to "−" position. This operation selects the shift range which prohibits $6^{th}$ gear.

When M position is selected and the up-shift switch 20 is not turned on, that is "no" is determined in Step S5, a shift gear is set according to each shift gear range (Step S8). That is, a shift pattern map according to the shift gear range shown in the second line or the lower line from the second line shown in the diagram in the manual shift mode in FIG. 8 is taken up, and the shift control is executed on the basis of the shift pattern map. An indicator which shows $6^{th}$ gear is not be "ON" in this condition, for example it is shown that the second overdrive (OD2 or $6^{th}$) gear is "OFF" (Step S9).

In the above-mentioned embodiment of the control device, a shift gear range is manually changed. It is, however, also available that a shift gear itself can be changed by operating the up-switch 20 or down-switch 19 in the condition where M position is selected by the shift device Sr. Each shift gear in this case is shown in FIG. 9, and any gear from $6^{th}$ gear to $1^{st}$ gear is available in M position. On the other hand, in the other forward position except M position, a shift gear is set based on a driving condition. That is the automatic shift mode. Each shift gear in this case is a gear from $5^{th}$ gear to $1^{st}$ gear as shown in FIG. 9. In this case, $6^{th}$ gear (the second overdrive gear) is set by a manual selection. Consequently, if a driver feels inconvenience caused by the small gear ratio of the shift gear and a rather high running resistance of the vehicle, the driver can select the shift position which does not include $6^{th}$ gear. Such inconvenience, then, can be avoided.

Incidentally, the control means for Step S6 shown in FIG. 1 is a highest gear control means.

Since the gear ratio of $6^{th}$ gear (the second overdrive gear) is small as mentioned above, the engine revolution is low at high speed. Consequently, the fuel economy of the engine improves. On the contrary, since the margin of driving torque is small in $6^{th}$ gear, the down-shift from $6^{th}$ gear easily happens when the acceleration pedal is slightly more pushed. Therefore, it is desirable that $6^{th}$ gear is set by the manual operation intended by the driver. In the aforementioned first embodiment, $6^{th}$ gear can only be set in the manual shift mode.

In place of the above-mentioned examples, it is also available that a special D position (D6) having $6^{th}$ gear in an automatic shift mode is independently set in addition to other positions. If $6^{th}$ gear is desired, it is necessary to select the special shift pattern by a manual operation. This example adopted to a control device of the second embodiment is explained as follows.

Figure 13:
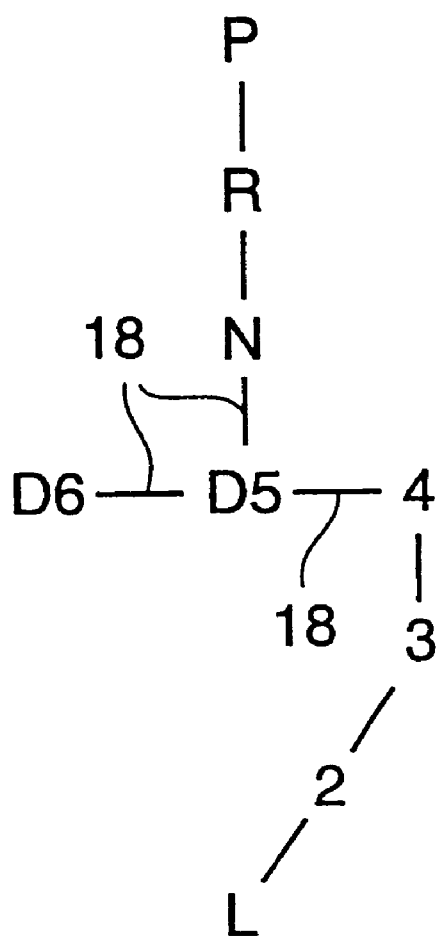
FIG. 13 is a schematic drawing showing each shift position of a shift device adopted to a control device of a second embodiment.

The shift positions selected by the shift device Sr are shown in FIG. 13. D5 position in which a shift gear from $5^{th}$ to $1^{st}$ gear is available is located next to N position. "4" position is located next to D5 position. "3", "2", L positions are disposed in series. The shift device Sr is guided to each position along a path 18. In "4" position each shift gear from $4^{th}$ to $1^{st}$ gear can be set. In "3" position each shift gear from $3^{rd}$ to $1^{st}$ gear is available. In "2" position $2^{nd}$ gear or $1^{st}$ gear is available. In L position $1^{st}$ gear can only be set.

On the other hand, D6 position as the second drive position is deposited at the opposite side of the "4" position, putting D5 position between "4" and D6 positions. In other words, N, D6, and "4" positions are deposited in the three different directions, and separately branch off from D5 position. Each position is connected by the guiding path 18.

In a usual driving, the shift lever of the shift device Sr is shifted from P position to D5 position. When a vehicle accelerates or decelerates, the shift lever is shifted to a preferable position from "4" position to L position. Each position from P position to L position is connected by the guiding path 18, though the guiding path 18 is partially turned at right angles or diagonally. On the other hand, D6 position branches off from the above-mentioned guiding path 18 from P position to L position.

Figure 14:
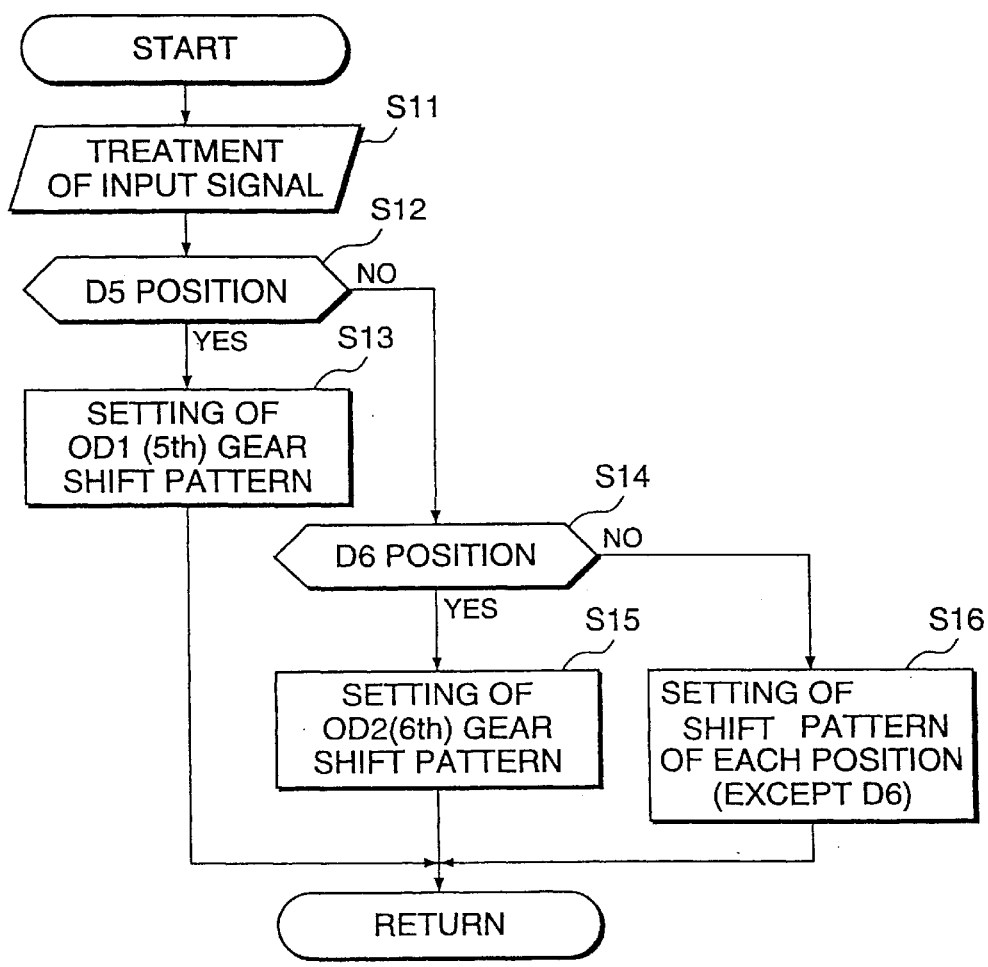
FIG. 14 is a flowchart which explains a control device for an automatic transmission as a second embodiment of the present invention.

The control device, as the second embodiment, having the above-mentioned shift positions is explained using FIG. 14. First, an input signal is treated (Step S11). Next, whether the first drive position D5 is selected or not is determined (Step S12). When "yes" is determined in Step S12, the first overdrive (OD1) gear shift pattern in which a shift gear from $1^{st}$ until $5^{th}$ gear is available is set (Step S13). Specifically, a shift pattern map in which the shift gear range is shown is taken up, and a gear shift is executed based on the shift pattern map. Since the highest gear in the shift pattern map is $5^{th}$ gear and the driving torque is sufficient, the busy shift does not happen.

On the other hand, when "no" is determined in Step S12 (the first drive position D5 is not selected), whether the second drive position D6 is selected or not is determined (Step S14). If "yes" is determined in Step S14, a shift pattern map of the second overdrive (OD2) is set, where a shift gear from $6^{th}$ gear to $1^{st}$ gear is available. Specifically, the shift pattern map in which $6^{th}$ gear range is set as shown in FIG. 10 is taken up, and a shift control is executed on the basis of the map. At the same time the lock-up pattern map shown in FIG. 11 is taken up. Since $6^{th}$ gear is set in the high speed running, the engine revolution is low. Consequently, a fuel economy of the engine is improved. Furthermore, since a margin driving torque in $6^{th}$ gear is small, a down-shift easily happens by a slight increase of the acceleration angle or a slight decrease of the vehicle speed.

If "no" is determined in Step S14 because the second drive position D6 is not selected, the gear shift pattern of each position is set (Step S16).

As mentioned above, in the second embodiment $6^{th}$ gear (the second overdrive gear) can be set by selecting the second drive position D6 deposited at the opposite direction from "4" position. D6 position is located apart from the normal path of the shift lever Lv. The normal path is used in a usual driving, in acceleration and deceleration, or in a "garage shift" driving. The shift lever of the shift device Sr is frequently changed from D5 position to R position and vice versa in the garage shift driving. Consequently, it is necessary to operate intentionally in order to set $6^{th}$ gear. Even though driving torque is not sufficient in $6^{th}$ gear, the driver already is aware of and accepts this fact. Accordingly, since this is not an unexpected driving condition for the driver, the driver does not feel uncomfortable. In order to avoid this driving condition it is recommendable to shift the shift lever of the shift device Sr from D6 to D5 position. By this shift, $6^{th}$ gear is prohibited in D5 position, and the uncomfortable driving feeling can be avoided.

Figure 15:
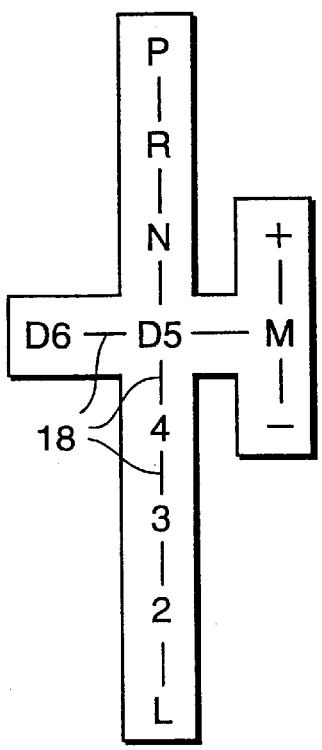
FIG. 15 is a schematic drawing showing another type of shift positions adopted to a control device of the second embodiment.

Incidentally, it is also available that the second drive position D6 is provided in a shift device which has M position, as shown in FIG. 15. This example is also adopted to the control device of the second embodiment. In this case D6 position separately branches off from the normal path 18 connecting P, R, N, D5, "4", "3", "2", and L position. The path 18 also connects D6 to D5 position. Since the driver needs to intentionally set $6^{th}$ gear in this case, the $6^{th}$ gear driving condition and the frequent gear change is acknowledged by the driver. The busy shift can be avoided by moving the shift lever of the shift device Sr.

The first drive position D5 corresponds to a highest gear prohibition position, the second drive position D6 to a highest gear permission position, and "4" position to a middle speed position.

A gear shift in an automatic transmission At is controlled on the basis of the above-mentioned shift pattern map. Accordingly, if the shift pattern map is changed, the gear shift is executed in the different shift pattern. The changed shift pattern map includes each different shift gear range, that is the number of available shift gears is different in the different gear range. The shift pattern map can be changed by taking up restored memories in the ECU.

Figure 18:
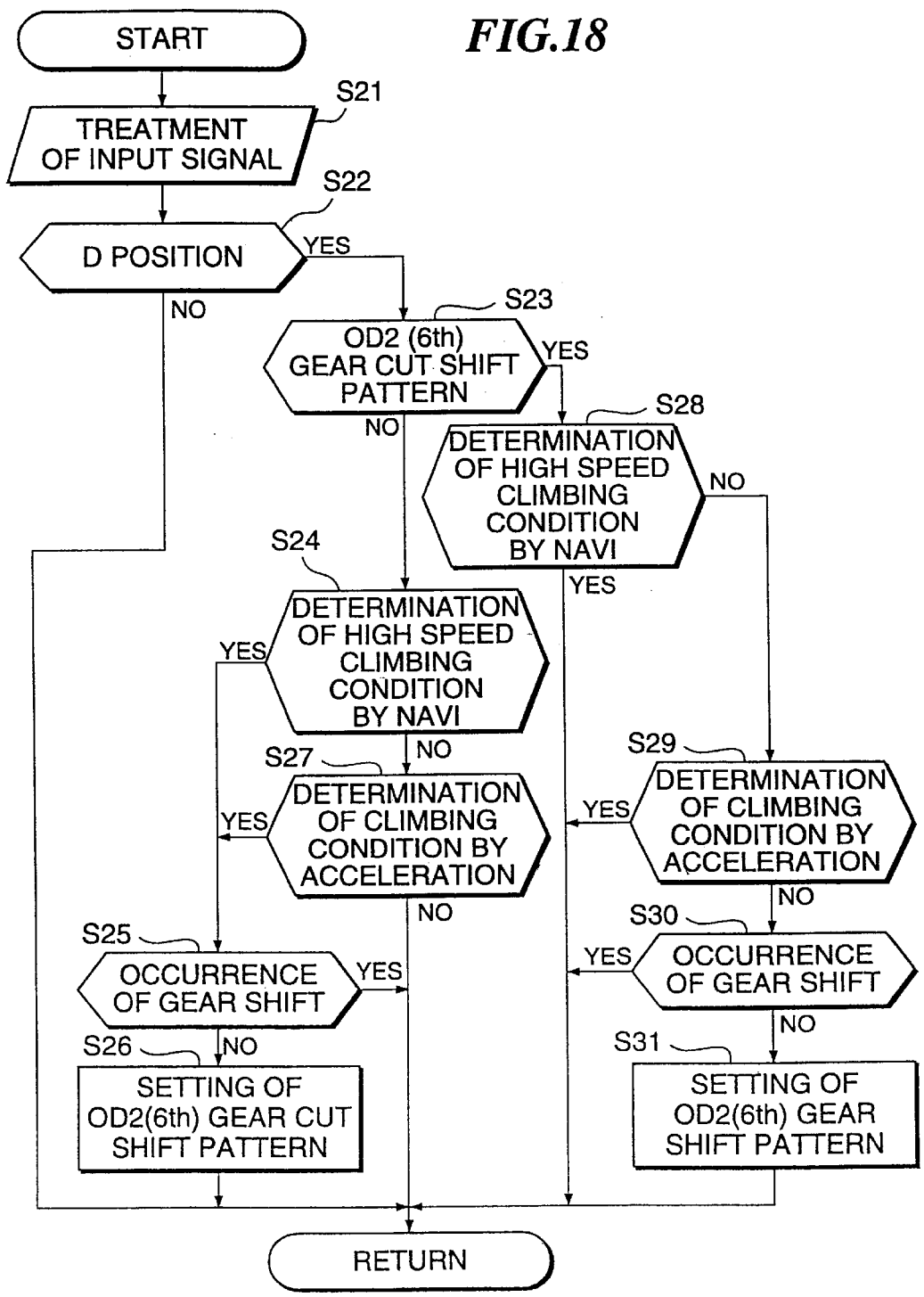
FIG. 18 is a flowchart which explains a control device for an automatic transmission as a third embodiment of the present invention.

As a control device of a third embodiment, one example of changing the shift pattern map or the shift pattern is next described. Referring to the flowchart in FIG. 18, after treating an input signal (Step S21), whether D position is selected or not is determined (Step S22). When D position is not selected, that is "no" is determined, the shift pattern according to the selected position is set. Consequently the step goes to "return". On the contrary, when D position is selected ("yes" is determined), whether OD2 cut shift pattern is set or not is determined (Step S23). In OD2 cut shift pattern, $6^{th}$ gear as the second overdrive gear is not set. That is, it is electrically detected and determined whether the shift pattern which prohibits $6^{th}$ gear is set or not, while holding the shift lever of the shift device Sr in the D position.

When "no" is determined in Step S23, that is the shift pattern in which $6^{th}$ gear is available is taken, whether there is a high speed climbing driving condition ahead of a vehicle or not is determined by a NAVI (Navigation System installed in the vehicle), in other words a driving instruction system (Step S24). The NAVI in advance memorizes electronic data of a road map, detects the position of the driving vehicle by a GPS (Global Positioning System) or a self-navigation system using a gyro sensor, and displays the vehicle's position on an electric map. Furthermore, the NAVI shows a recommended driving course from a present position to an inputted destination, and a condition of the road instructed by the NAVI or the road ahead is also outputted. The road condition indicates curve or straight, a degree of the curvature, a kind of the road, a climbing or a down slope, an inclination of the slope, paved or not, a coefficient of friction of the road, etc. Incidentally, a conventional NAVI can be adopted. Since the NAVI can detect the scheduled course and the road condition of the scheduled course, whether the road ahead is for a high speed driving and whether the inclination of the slope is equal to or over a predetermined value can be determined in Step S24.

When "yes" is determined, that is the vehicle is running in $6^{th}$ gear which is the highest gear of the automatic transmission, whether a gear shift occurs or not when $6^{th}$ gear is prohibited is determined (Step S25). This is a preparatory determination for high speed climbing. If a down-shift occurs when $6^{th}$ gear is prohibited, a driver feels uncomfortable, because the gear shift is not caused intentionally. Therefore, the step proceeds to "return" in order to avoid this uncomfortable feeling. On the other hand, when "no" is determined in Step S25, that is gear shift does not occur, an OD2 cut shift pattern which prohibits the second overdrive gear ($6^{th}$ gear) is set (Step S26). Specifically, a shift pattern map which does not have a shift gear range of $6^{th}$ gear is taken up, and the shift control is executed on the basis of the shift pattern map.

When "no" is determined in Step S24, a high speed climbing is determined by an actual driving condition (Step S27). Whether the vehicle runs at high speed or not is determined by detecting whether the actual speed is equal to or over a predetermined value or not. Whether the inclination of the slope is equal to or over a predetermined value (that is, the running resistance of the vehicle is equal to or over a predetermined value) is determined by detecting whether the actual acceleration is equal to or less than a standard value based on a throttle angle or not. Incidentally, since the inclination of the slope of the high speed road does not increase suddenly, whether a high speed slope is ahead in the scheduled course can also be determined based on a decreasing rate of the acceleration of the vehicle.

When "yes" is determined in Step S27, as the same as "yes" is determined in Step S24, the step proceeds to Step S25. Whether a gear shift occurs or not if $6^{th}$ gear is prohibited is, here, determined. If the gear shift does not occur, the OD2 cut shift pattern (that is, $6^{th}$ gear is prohibited.) is set. On the contrary, if it is determined that the shift occurs, the step goes to "return".

When "yes" is determined in Step S23, because the above-mentioned Step S26 is already executed, a reversion from the OD2 cut shift pattern is next done. That is, whether a road ahead requires a high speed climbing condition is determined by the NAVI (Step S28). When "yes" is determined in Step S28, any shift gear change is not executed and the step goes to "return", in order to keep $6^{th}$ gear prohibited, that is in order to continue the previous control.

On the contrary, when "no" is determined in Step S28, that is there is not a road ahead for a high speed climbing, whether there is such a high speed climbing road or not is determined by actual driving conditions, such as an actual vehicle speed and/or an actual acceleration of the vehicle (Step S29). Since an inclination of the high speed road does not decrease suddenly in this case, whether the high speed climbing road ends or not can also be predicted on the basis of an increasing rate of the acceleration. If "yes" is determined, that is the high speed climbing road continues, in Step S29, the step proceeds to "return" without any control, and in order to keep $6^{th}$ gear prohibited, in the same way as the case where "yes" is determined in Step S28.

On the other hand, if "no" is determined in Step S29, this means the high speed climbing road ends. It is then determined whether a gear shift occurs or not when a shift pattern where $6^{th}$ gear is available is selected (Step S30). When the gear shift occurs when the shift pattern is changed in Step S30, the step proceeds to "return" without any control in order to avoid an unexpected gear shift. On the other hand, however, when it is denied in Step S30 that the gear shift occurs, the OD2 shift pattern where $6^{th}$ gear can be set is selected. (Step S31). Specifically, the above-mentioned shift pattern map shown in FIG. 10 is taken up, and the shift control is executed based on the shift pattern map. In this case, the lock-up map shown in FIG. 11 which controls the lock-up clutch 15 can be selected.

Since the vehicle runs in $5^{th}$ gear in which the vehicle has enough driving torque when the vehicle runs on the high speed climbing road, the down-shift does not easily occur if the acceleration pedal is slightly pushed to maintain the current vehicle speed or etc. Consequently, the busy shift can be avoided. Furthermore, since the second overdrive gear ($6^{th}$ gear) can be set when the high speed climbing road ends, a fuel consumption can be reduced because the engine revolutions reduce at high speed.

Explaining the relation between this example and the present invention, the above-mentioned navigation system (NAVI) corresponds to a driving instruction system, and the means for setting OD2 ($6^{th}$ gear) cut shift pattern corresponds to a highest gear prohibition means.

Next, a control device of a fourth embodiment of the invention is described. It is also available that a vehicle having the control device of this present invention is controlled to follow another vehicle ahead. In the following control, another vehicle is detected by a radar system such as a laser radar, and a predetermined distance between the vehicle having the radar system and another vehicle ahead is maintained. A throttle angle or a gear ratio of an automatic transmission mounted on the vehicle with the radar system is controlled so that the vehicle speed and the aforementioned distance is maintained. Since it is desired that a response of an accelerating or decelerating control is quick in this following driving, the control is executed as follows.

Figure 16:
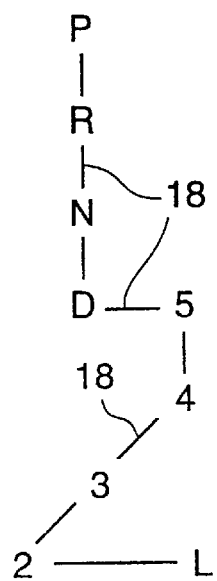
FIG. 16 is a schematic drawing showing each shift position of a shift device adopted to a control device of a fourth embodiment.

The shift positions shown in FIG. 16 are adopted to the control device of the fourth embodiment. The shift positions selected by the shift device Sr are arranged deposited, as shown in FIG. 16. P, R, N, D, "5" "4", "3", "2", and L positions are located in series. Each position is connected by a guiding path 18. Available shift gears in the forward driving position from D to L position are shown in FIG. 17. When D position is selected, a shift gear from $6^{th}$ to $1^{st}$ gear is set based on the driving condition. From "5" to L position the highest gear in each position is one gear lower respectively. In changing each position the shift control is executed by taking up the shift pattern map having each shift gear range responding to each position, and by treating a respective output signal.

Figure 19:
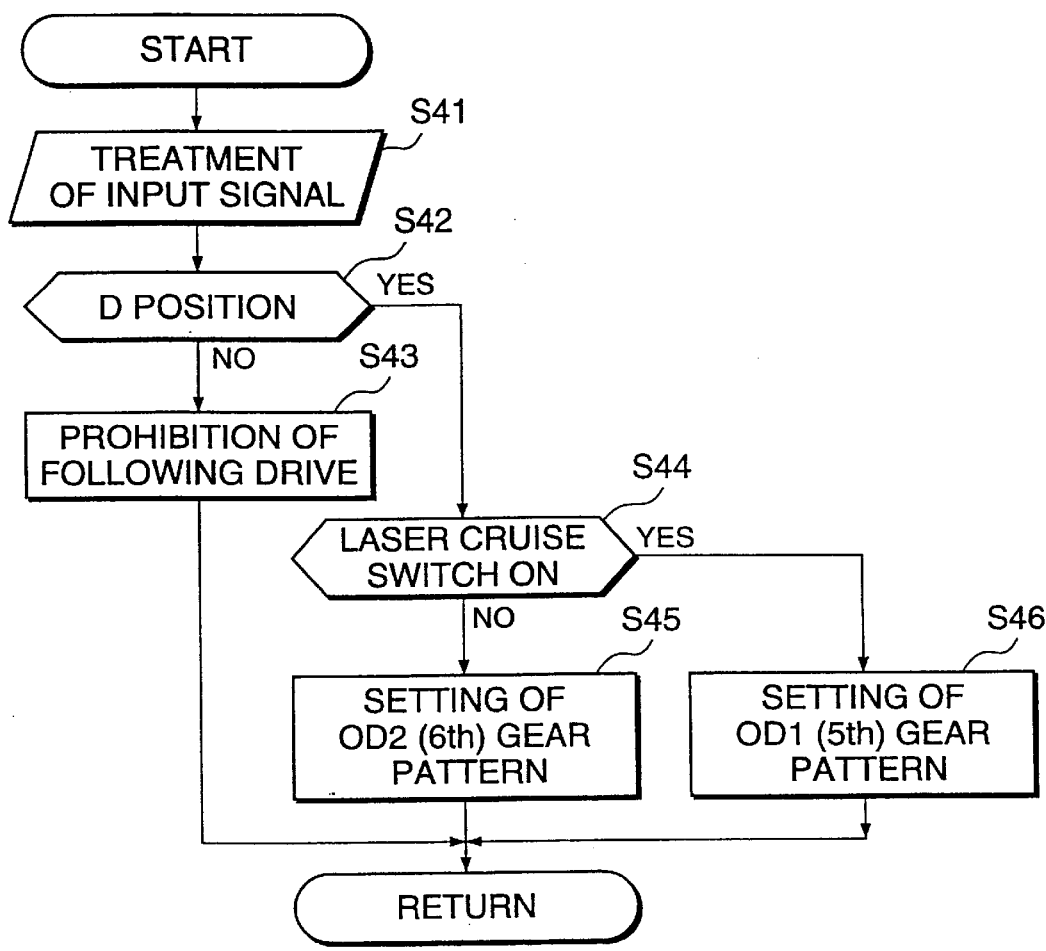
FIG. 19 a flowchart which explains a control device for an automatic transmission as a fourth embodiment of the present invention.

FIG. 19 is a flowchart of the control device as the fourth embodiment. An automatic transmission mounted on a vehicle which has a following control system has six forward gears including $5^{th}$ and $6^{th}$ gears, as overdrive gears. Another example of shift positions setting those shift gears is shown in FIG. 20. For forward driving D, "4", "3", "2", and L positions are provided. Each shift gear which can be set in each position is shown in FIG. 20. Incidentally, in this example shown in FIG. 20, all six shift gears from $1^{st}$ to $6^{th}$ gear can be set in D position as the same as the above-mentioned examples, but "5" position is not provided.

After a treatment of an input signal in FIG. 19 (Step S41), whether D position is selected by the shift device Sr or not is determined (Step S42). In D position, as shown in FIG. 20, a forward driving shift gear is set on the basis of a driving condition of the vehicle. When "no" is determined in Step S42 because a shift position except D position is selected, the following drive system is prohibited (Step S43). If N position is selected, the following drive system is prohibited. Furthermore, even though a forward drive position is selected, in a position except D position (in such a position an engine brake is available) the highest gear is $4^{th}$ gear or the lower gear. Consequently, this condition is not suitable for the following drive. When a position except D position is selected, therefore, the following drive system by itself is prohibited.

Incidentally, if the following drive is suitable in $4^{th}$ gear (the highest gear in "4" position), it is also available that the following drive system is not prohibited when "4" position is selected.

On the contrary, when D position is selected ("yes" in Step S42), whether a laser cruise switch is turned on or not is determined (Step S44). "On" of the laser cruise switch means that another vehicle ahead is detected by the laser radar mounted in a vehicle and is followed with maintaining a predetermined distance between the vehicle and another vehicle ahead. When the laser cruise switch is not turned on in Step S44, a shift pattern in which the second overdrive gear (OD2, that is $6^{th}$ gear) is available is selected (Step S45). On the other hand "yes" (the switch is on) is determined in Step S44, a shift pattern in which $5^{th}$ gear is the highest, that is $6^{th}$ gear is prohibited, is set (Step S46). In this case, the highest ($6^{th}$) gear is prohibited, when a mode of following another vehicle begins (that is, the laser cruise switch is turned on).

Incidentally, it is also available that the highest gear is prohibited, when the vehicle actually begins to follow another vehicle.

Specifically, in the case where D position is selected and the following drive system is not executed, the shift pattern map in which $6^{th}$ gear range is set as shown in FIG. 10 is taken up, and the shift control is executed. At the same time the lock-up map shown in FIG. 11 is read, and the lock-up clutch 15 is controlled in the condition where $6^{th}$ gear is set. Since the engine revolutions are reduced at high speed, fuel efficiency improves. On the contrary, in the following drive a shift pattern in which $6^{th}$ gear range is excluded from the shift pattern shown in FIG. 10 is taken up, and the gear shift is controlled based on this modified shift pattern. Since the highest gear is $5^{th}$ gear, then, the gear ratio of the automatic transmission at high speed is not so small (even though less than 1). Consequently, a certain extent amount of driving torque is secured. Therefore, a response in following another vehicle ahead is improved.

Figure 21:
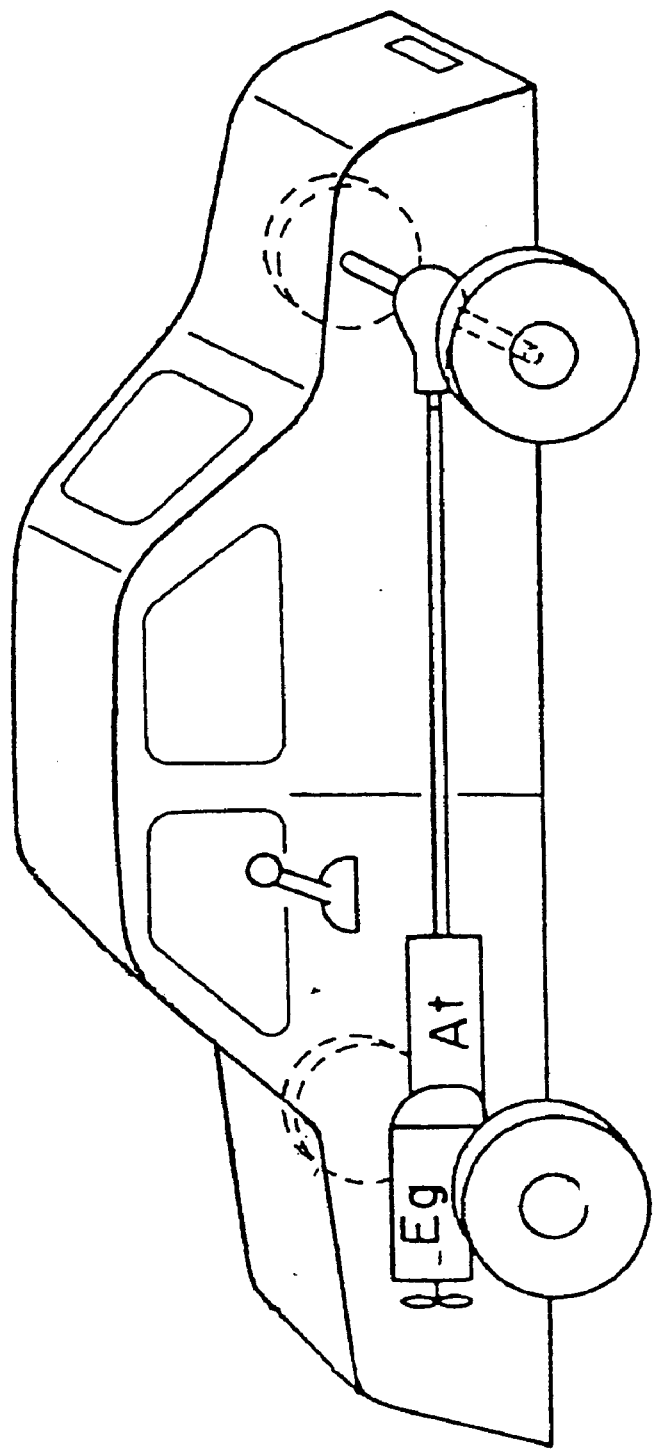
FIG. 21 is a schematic view of a vehicle on which an automatic transmission with a control device of the first embodiment is mounted.

One example of vehicles which respectively include the above-mentioned automatic transmissions is schematically shown in FIG. 21.

The means for executing the control shown in FIG. 19 corresponds to a highest gear prohibition means.

As mentioned above, the embodiments are explained based on the examples shown in the above-mentioned figures. It is not limited to these embodiments. That is, an automatic transmission which has three or more overdrive gears is also available. The gear ratios of the overdrive gears are less than 1. It is not limited to the gear train arrangement shown in FIG. 2. Furthermore, a continuously variable transmission which does not have a finite number of shift gears is also available. Furthermore, the transmission mounted on a vehicle which includes an electric motor or a motor generator as a driving power source in place of the internal combustion engine, is also available.

The shift device Sr which selects each shift position is provided for changing each oil pressure supplying to each passage according to each shift position. Consequently, it is also available that a shift device outputs an electric signal by a manual operation, such as a switch lever, in place of the shift lever mechanically connecting to each manual valve. That means the present invention can also be adopted to a control device for a "shift by wire" type automatic transmission.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A control device for an automatic transmission comprising:

a plurality of gears including a highest gear;

means for determining a high vehicle speed condition; and a highest gear prohibition means for prohibiting the smallest gear ratio of the gears of the automatic transmission when a running resistance of the vehicle is equal to or over a predetermined value and the high vehicle speed condition is determined to be present.

* * * * *